March 31, 1931. F. H. BENTON 1,798,863
LINK BLOCK CONTROLLING MEANS FOR LOCOMOTIVE VALVE ACTION
Filed May 6, 1927  4 Sheets-Sheet 2
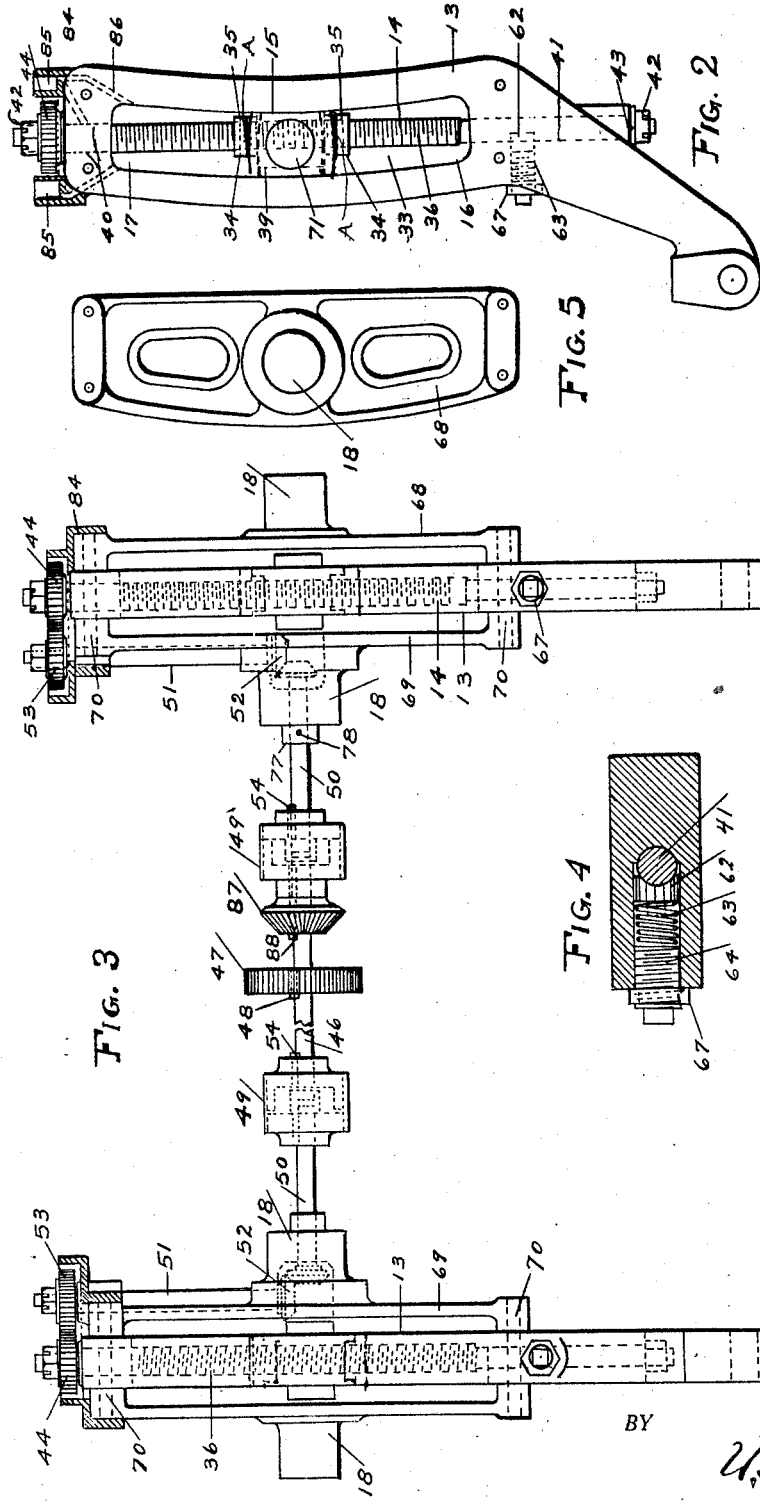
INVENTOR.
FRANK H. BENTON
BY
U. G. Charles
ATTORNEY.

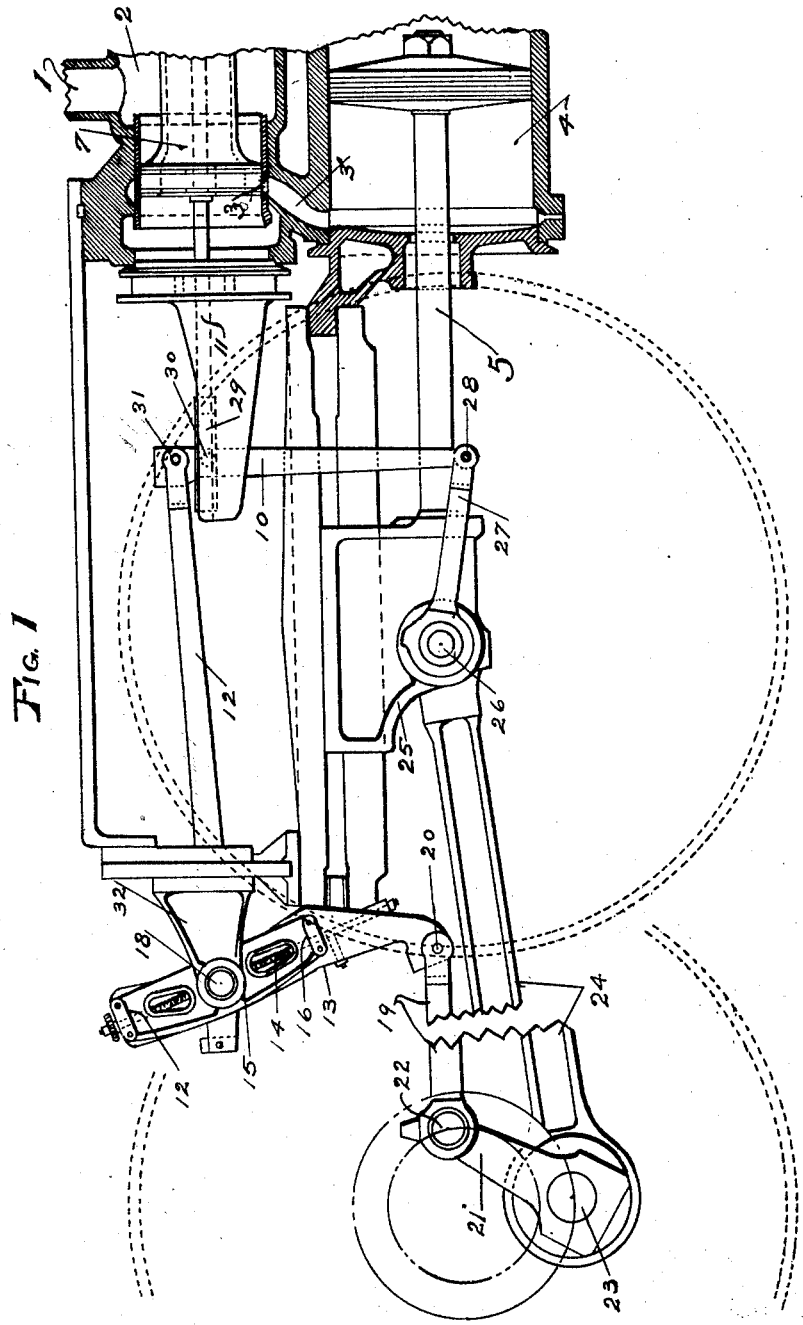

March 31, 1931.    F. H. BENTON    1,798,863
LINK BLOCK CONTROLLING MEANS FOR LOCOMOTIVE VALVE ACTION
Filed May 6, 1927    4 Sheets-Sheet 3
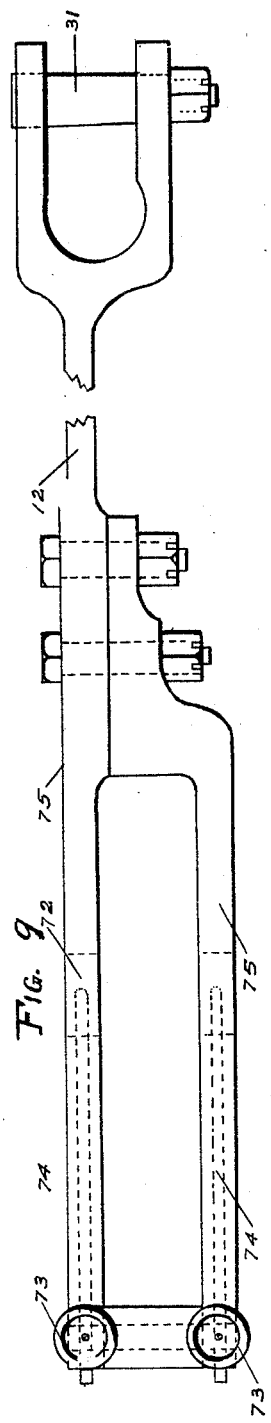
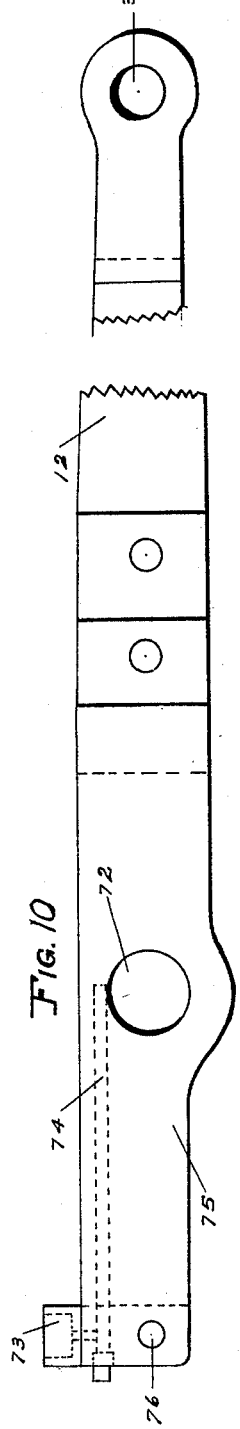
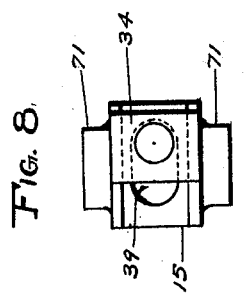
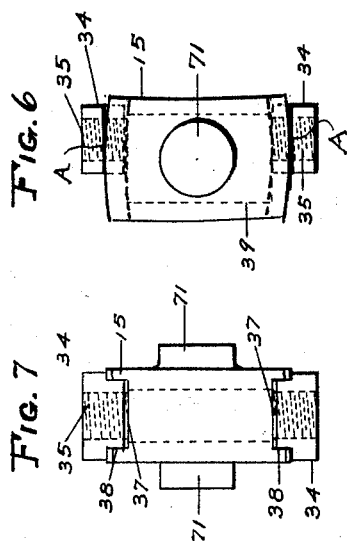
INVENTOR.
FRANK H. BENTON
BY
*U. G. Charles*
ATTORNEY.

March 31, 1931.  F. H. BENTON  1,798,863
LINK BLOCK CONTROLLING MEANS FOR LOCOMOTIVE VALVE ACTION
Filed May 6, 1927    4 Sheets-Sheet 4
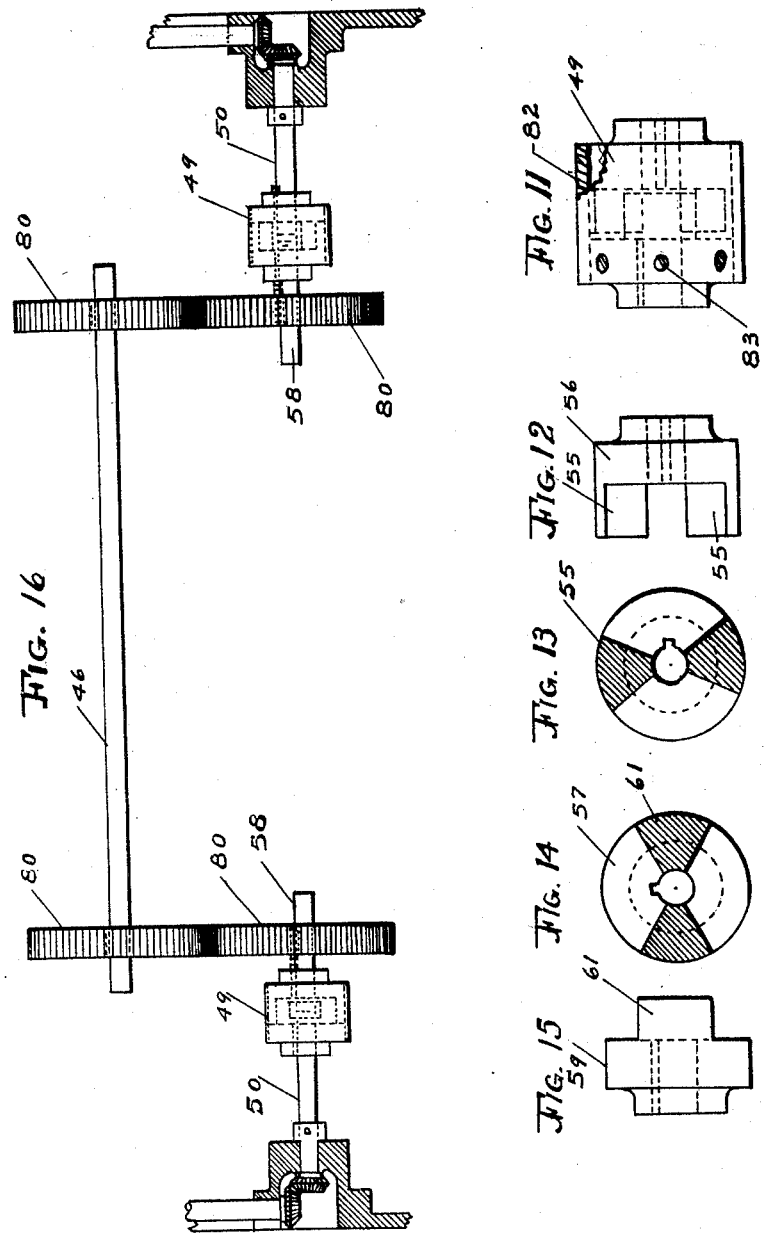
INVENTOR.
FRANK H. BENTON
BY
*U. G. Charles*
ATTORNEY.

Patented Mar. 31, 1931

1,798,863

UNITED STATES PATENT OFFICE

FRANK H. BENTON, OF TOPEKA, KANSAS

LINK-BLOCK-CONTROLLING MEANS FOR LOCOMOTIVE-VALVE ACTION

Application filed May 6, 1927. Serial No. 189,351.

My invention relates particularly to the Walschaert valve gear, but it will be evident that said invention may be used in other connections, and I do not wish to be limited to the exact construction shown and described.

The object of my invention is to provide a means of controlling the link block of the Walschaert valve gear in such a way as to eliminate all slip thereof and to support the link block by the link.

Various methods are employed for supporting the link block, such as reverse shafts having swing hangers or sliding lifters attached to the radius rod in which the link block is carried.

Link blocks supported in such manner have a continuous slip in the link, causing wear of the link and link block. It also causes severe strain in the whole valve gear and reverse mechanism resulting in unequal steam distribution with loss of energy and consequent high fuel consumption.

My invention provides a means of carrying the link block by the link, eliminates all slip of the link block and greatly reduces the number of wearing parts in the valve gear.

With my system of carrying the link block, the reverse mechanism is relieved of all load and performs no service whatever except when it is desired to adjust the cut off or reverse the locomotive, while with the usual method of supporting the link block the reverse mechanism is under severe strain continually.

These and other objects will hereinafter be more fully explained.

Referring to the drawings:

Fig. 1 shows a valve gear assembled.

Fig. 2 is a side elevation of the link.

Fig. 3 is a rear view of the link block and link control system assembled.

Fig. 4 is a sectional view of the control screw tensioning means in the link.

Fig. 5 is a side view of the link frame.

Fig. 6 is a side view of the link block.

Fig. 7 is a transverse view of Fig. 6.

Fig. 8 is an end view of Fig. 6.

Fig. 9 is a plan view of the radius rod.

Fig. 10 is a side view.

Fig. 11 is a side view of the clutch assembled.

Fig. 12 is an elevation of one of the clutch lugs.

Fig. 13 is an end view looking into the lugs.

Fig. 14 is an end view looking into the end of the other half of the lugs.

Fig. 15 is a side view of Fig. 14.

Fig. 16 is a view of the shafting and gear arrangement as designed to connect over centrally positioned obstructions, said obstructions not being shown.

In the following description like characters will apply to like parts throughout the various drawings.

In Fig. 1 what is known as the Walschaert valve gear is shown modified to receive my link block control system, in which 1 is a passage through which steam enters the chest 2. 3 and 3' are ports through which steam passes to the cylinder 4. 7 is a valve which controls the steam in passing from the steam chest 2 through the ports 3 to the cylinder 4 and in exhausting from the cylinder. 11 is a valve stem which connects the valve 7 with valve stem cross head 29 by means of pin 30 which carries the combination lever 10.

With link block 15 in center of the link 13 as shown the valve 7 is controlled entirely by the combination lever 10. With link block 15 in any other position in the link 13 except at center as shown, the valve 7 is controlled by both the combination lever 10 and the link 13.

The link block 15 is carried and controlled by the link block control screw 14. By revolving the screw 14 the link block 15 is caused to move upward or downward and carries with it the back end of the radius rod 12.

With link block 15 at any point in the link 13 between central point as shown and bottom end 16 of the link 13, the valve gear is said to be in the go-ahead gear and the locomotive will move forward. If link block 15 is at any point in the link 13 between central point as shown and the top end 17 of the link 13 the gear is said to be in back-up gear and the locomotive will move backward.

The minimum valve travel is obtained when link block 15 is in the center of link 13, and the maximum travel of the valve is obtained when link block 15 is at points 16 and 17.

The link 13 oscillates on its trunnion 18 and has a total swing of approximately forty-five degrees. Motion is imparted to the link 13 by the eccentric rod 19 and the pin 20. Motion is imparted to the eccentric rod 19 by the eccentric crank 21 pivotally engaging with said rod as at 22 and the main crank pin 23. Last said pin is caused to revolve through the medium of the main rod 24 pivotally connecting with the crosshead 25 which is carried by the piston rod 5. The lower end of the combination lever 10 is rocked by the union link 27 pivotally engaging therewith as at 28, and the opposite end of said link rockably engages with the crosshead pin 26. Bracket 32 supports the link 13 and may be of any form to suit the surrounding conditions. The link block 15 is controlled and held in any desired location in the link slot 33 by means of the link block control screw 14.

At either end of the link block 15 are nuts 34 having screw threads 35 which have smooth working fit with screw threads 36 of the link block control screw 14. These nuts 34 have tongues 37 which engage the slot 38 in ends of the link block 15 and prevent nuts 34 from revolving when the link block control screw 14 revolves.

The link block 15 is caused to move in the link slot 33 by revolving the control screws 14 and as the said block follows the curve of the link slot 33 the link block nuts 34 slide across the end of the link block in their respective slots 38, thus allowing free movement of the said block 15 in traveling full length of the said link slot without binding or cramping. The link block 15 has an elongated aperture 39 axially extending therethrough as shown in Fig. 8, the said aperture being of ample size to permit free movement of the said block while traveling full length of the link slot without contacting the screw, the nuts pivotally rocking at A.

The screw threads 36 of the link control screw 14 may be of any desired shape but preferably they should be of modified square thread type having coarse pitch and deep to provide ample strength and bearing surface.

The link block control screw 14 on one side of the locomotive will have a right hand thread while the one on the opposite side of the locomotive will be a left hand thread in order that the link blocks 15 will move in the same direction in their respective links when operated as the screws 14 revolve in opposite direction.

Castellated nuts 42 are provided at each end of the link block control screw for the purpose of holding it in proper position and rotatable in the link.

The controlling screw is trunnioned in the link as shown by dotted lines at 40 and 41. The outer ends thereof are shouldered against which is seated a gear 44 at one end and a washer 43 at the other end, both of which are rigidly attached by said castellated nuts.

On most of the modern locomotives some kind of power reverse gear is employed, and any kind of power reverse gear may be used in connection with my link block control system, or it can be operated by hand from the cab of the locomotive.

Whatever the form of reverse mechanism it is probable that connection to the shaft 46 will be made by means of a gear wheel 47, which is secured to the shaft 46 by means of a key 48.

When it is desired to move the link block 15 in the link 13 the reversing mechanism is started causing the gear wheel 47 to revolve by which means the shaft 46 is revolved.

Motion is transmitted from the gear wheel 47 to the link block control screw 14 by means of jointed shafts consisting of members 46, 50, and a shaft 51, the clutches 49, and the gear wheels 44, 52, and 53. Gear wheels 52 and 53 are secured to the shafts 50 and 51 by suitable keys as shown. Shaft 51 is carried by ample bearings in the link frame 68.

Secured to the shaft 50 is a collar 77 by pin 78. The said collar 77 serves to hold the shaft 50 in its proper location.

The shafts 46 and 50 as shown pass directly across the locomotive and it frequently occurs that some obstruction such as driving wheels, springs, etc., prevent passing the shafts directly across, and in such case it becomes necessary to introduce an arrangement as shown in Fig. 16. The gear wheels 80 are of such diameter that shaft 46' will pass the obstruction.

No supports are shown for shafts 46, 46', 50 and 58. Bearings for these may be of any suitable design and will necessarily vary to suit surrounding conditions.

Clutches 49 are secured to the shafts 46 and 50 by keys 54. One member of the clutch 49 is attached to the shaft 46 and the opposite member is attached to the shaft 50. This clutch 49 has a casing 82 for protection and is secured to the clutch 49 by screws 83.

When clutch 49 is assembled the lugs 55 of member 56 occupy spaces 57 of member 59, and as lug 55 does not fill the space 57 completely, that portion of the space 57 unoccupied by the lug 55 is slightly more than equal to the total swing of the links 13, so that said links may swing or oscillate about the trunnion 18 without moving the gear wheel 47.

As the movements of the two links occurs alternately the excess space 57 for the lugs 55 of the clutch 49 is sufficient to allow for this alternating motion, therefore the cramping of the shaft 46 and the tendency to revolve the link block control screw 14 is eliminated.

The clutch members 56 and 59 are so designed that the space in which their respective lug members 55 and 61 engage is large enough to allow for partial rotation before the said lugs contact by which means provision is made for the link block control screw 14 to revolve slightly before its motion is stopped by the gear wheel 47 and its controlling mechanism. Being so arranged I have provided a friction means to prevent free rotation of the control screw 14, said means consisting of a friction block 62 seated on the smooth shank 41 of the screw and being tensioned by a spring 63 which is compressed by a stud 64 threadedly engaging in the outer end of the apertures in which said members are positioned. When proper tension is placed on the block 62 the screw is locked by means of a jamb nut 67 threadedly engaging thereon and snugly contacting with the link (the said members being shown in Fig. 4).

The members 68 and 69 are link frames which support the link 13, the same being secured to the link 13 by bolts 70. Figs. 9 and 10 show radius rod 12 which is the usual form of a radius rod modified to suit the requirements of my link block control system. The rear end of said rod 12 is pivotally connected to the link block 15 as at 71 by means of apertures 72 as shown in Figs. 9 and 10. The said pivotal bearings 71 are lubricated by the oil cup 73 which is fed to the bearing 71 through apertures 74. The said oil cups are secured to the jaws 75 of the radius rod by bolt 76.

Gear wheels 44 and 53 are protected by a housing 84 which contains oil cavity 85 for oiling the link block control screw bearing 40 and the screw threads 14. It also lubricates the faces of the link slot 33 and the link block 15. 86 are oil ducts in the link 13 for conducting oil from the housing 84 to the various bearings.

Such modifications may be employed as lie within the scope of the appended claims.

Having thus described my invention, what I claim as new and desire to secure by Letters Patent is:—

1. In a link block, a block slidably positioned in an arcuated guide in a link, the block having an attaching means for the radius rod of a locomotive valve action, said means affixed to the block, said block rectangular in cross section and channeled in the center to permit the passage of a screw member trunnioned in the link and threadedly engaging tongued nuts in slidable engagement with either end of the block and the tongued nuts being held against rotation by reason of the tongued portion positioned in grooves formed on both ends of the block and the ends of the block being curved on a radius whose center is the center of the block and to bear against the said tongued nuts at a point of tangency at which the motion of the screw travel is imparted to the block for the purpose of permitting the positioning of the link block in the arcuated guide of the link to set the valve action for forward or reverse and for different cut-off of steam admission as desired.

2. In a link block mechanism for positioning by screw rotation in an arcuated guide in a link, a link block the surfaces of which on two sides are formed concentric with the radius of the arcuated guide and having at either end a nut, each carrying a tongued portion slidably engaging in grooves on the said ends and the said ends slidably contacting an undercut portion of the nuts at a point of tangency determined by curved surfaces whose radii are the center of the block and the block being channeled at its center in a longitudinal direction to permit the passage of a screw threadedly engaging the nuts and to permit the movement of the block at right angles to the axis of the screw in the travel of the block in the arcuated guide for its various positions in the link for the control of the valve mechanism on a locomotive.

In testimony whereof I affix my signature.

FRANK H. BENTON.